W. E. BUDD.
TIRE STRUCTURE.
APPLICATION FILED DEC. 31, 1913.
1,283,654.
Patented Nov. 5, 1918.
2 SHEETS—SHEET 2.
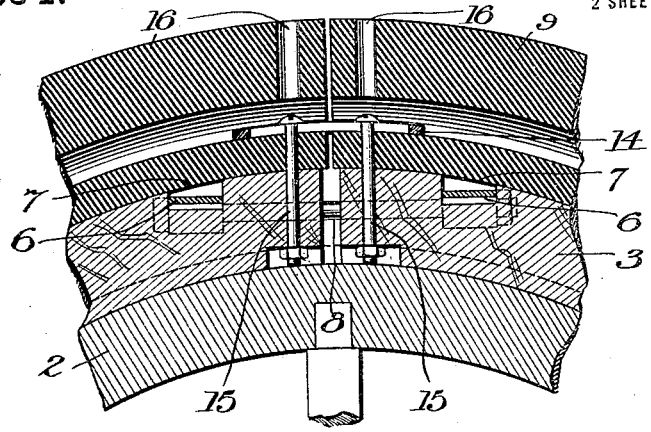
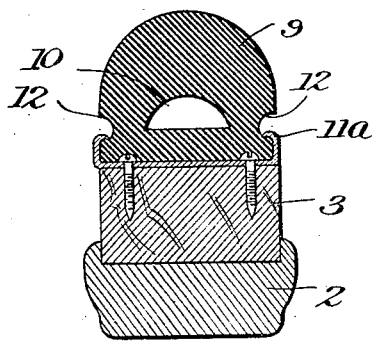
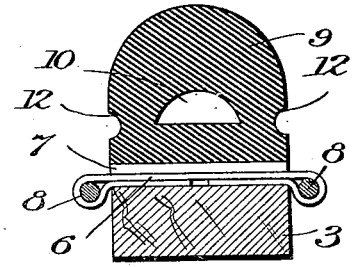
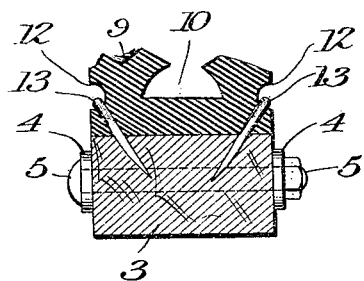
Witnesses
Philip E. Barnes
James Atkins
Inventor
William E. Budd
By
Edmund H. Parry
Attorneys

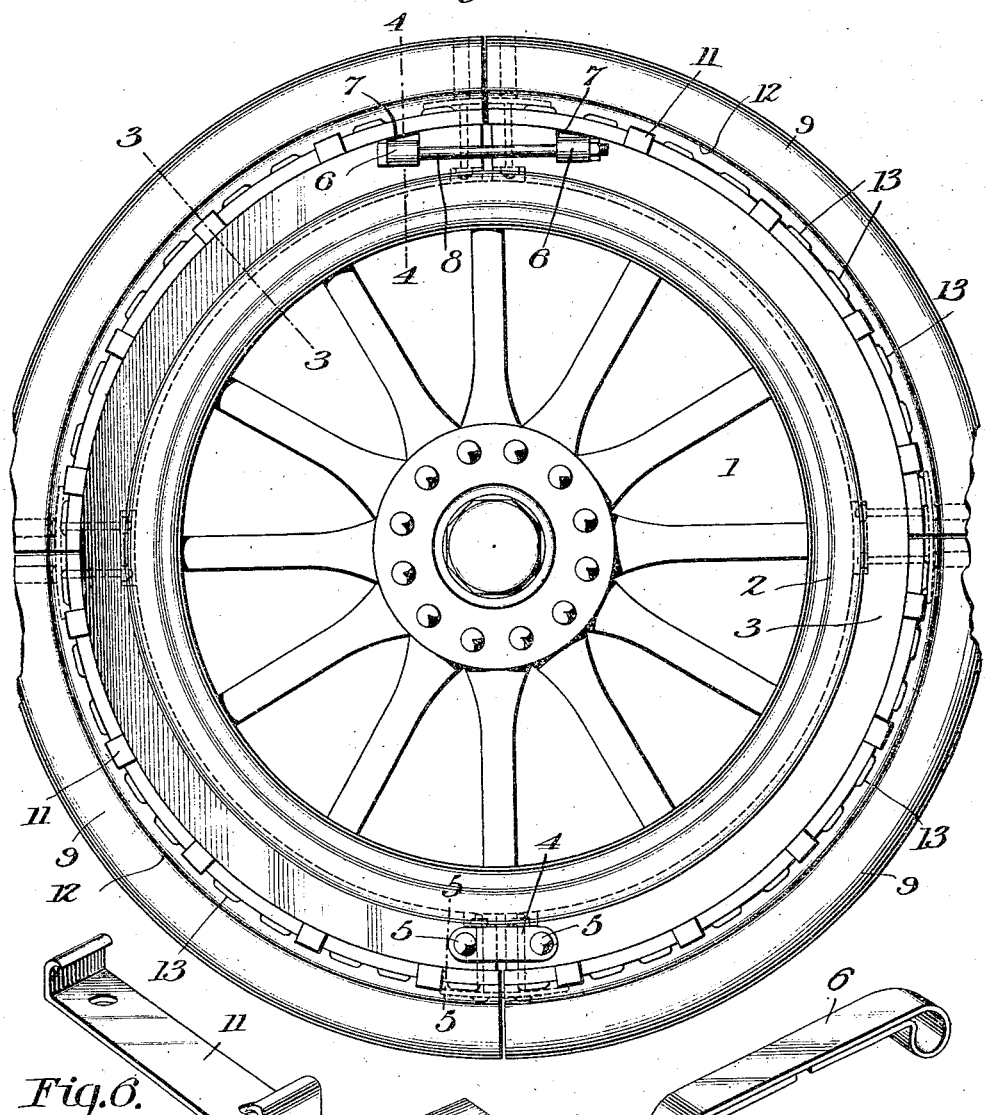

UNITED STATES PATENT OFFICE.

WILLIAM E. BUDD, OF ELIZABETH, NEW JERSEY.

TIRE STRUCTURE.

1,283,654.
Specification of Letters Patent.
Patented Nov. 5, 1918.

Application filed December 31, 1913. Serial No. 809,672.

*To all whom it may concern:*

Be it known that I, WILLIAM E. BUDD, a citizen of the United States, residing at Elizabeth, in the county of Union and State of New Jersey, have invented certain new and useful Improvements in Tire Structures, of which the following is a specification, reference being had therein to the accompanying drawing.

This invention relates to tire structures and more particularly to an aggroupment of elements constituting a tire structure which is, as an entity, attachable to and demountable from a vehicle-wheel.

The object of the invention is to provide a structure of the kind specified so that it may—though comprising a plurality of components—as an entity be quickly and conveniently clamped to or demounted from a vehicle-wheel having a rim of, say, standard construction.

Another object is so to construct the components of the structure that they may be manufactured at comparatively low cost and marketed, as a complete structure, with profit.

Still another object of the invention is to provide a structure which may readily be substituted, at any time and without the aid of skilled artisans, for a tire (damaged or otherwise) of the so-called pneumatic type; in other words, the structure is such that, in the event that a pneumatic tire has become damaged and become useless on the road, it may be substituted therefor by merely mounting it on the regular wheel-rim. To this end, the structure may be carried on the vehicle as an emergency-tire, though my invention is not limited to this specific use.

With these and other objects in view, the invention resides in the novel combination, aggroupment and construction of parts, all as hereinafter fully described and claimed.

In the accompanying drawings, forming a part hereof and in which like letters of reference indicate corresponding parts, I have exemplified one embodiment of the invention, it being manifest that other embodiments are possible and still be within the spirit of the invention and the scope of the appended claim.

In these drawings:

Figure 1 is a view in elevation of a vehicle-wheel with my improved tire-structure mounted thereon;

Fig. 2 is a fragmentary view, in vertical horizontal section, of the same;

Fig. 3 is a view in vertical transverse section, on the line 3—3, Fig. 1;

Fig. 4 is a similar view on the line 4—4, Fig. 1;

Fig. 5 is a fragmentary view, in vertical transverse section, on the line 5—5, Fig. 1; and Figs. 6, 7 and 8 are detail views of certain securing-devices forming parts of the invention.

Referring to the drawings, the reference-character 1 designates, generally, a vehicle-wheel which may be of any preferred construction and which, in this instance, preferably includes, among other features, a wheel-felly, rim or flanged band 2. In the example illustrated, this wheel-rim or band has upstanding flanges.

Encircling said wheel-felly or band is a tire-carrying rim-member 3 of wood or other appropriate material and which, in the embodiment shown by way of example, is divided into two sections or portions. Obviously, means must be provided for securing these sections together and to this end, I elect to hinge together two of the proximate ends of the sections and to connect the other ends by a clamping device presently to be described.

The aforementioned hinge-connector preferably comprises two side-plates 4 mounted at opposite sides of the rim-member and these are connected by bolts or rivets 5 which extend through the rim-member. This form of hinge-connection greatly protects and strengthens the ends of the rim-member.

The aforementioned clamping - device preferably comprises two transversely-extending loop-elements 6 disposed in depressions 7 in the periphery of the rim-member 3, and are connected by elongated bolts 8 which extend in parallelism to the sides of the rim-member. By reason of the fact that the loops extend beyond the sides of the structure, they afford an easy and convenient means for adjusting it on or removing it from the wheel.

It is to be understood that, where it is desired to mount my tire-structure upon a wheel, the two sections of the rim-member 3 are opened out—by rocking them on their hinge-connection—sufficiently to permit said sections to be disposed around the wheel-felly 2. By reason of the felly being flanged, the member 3 is seated between and held against lateral displacement by the flanges. The two unhinged ends having been brought into proper securing relation, the bolts 8 are inserted in the loop-elements 6 and, by tightening them, the ends of the sections of the rim are not only forced or drawn toward each other, but, during such operation, the whole rim-component is also firmly clamped upon the wheel-rim, there having previously been securely attached to it a tire-component 9 which, in this instance, is shown as of the cushion-tire form. It is provided with a semi-circular channel 10 and is formed of a plurality of sections adapted, if desired, to be independently secured to the rim-member and to be attached to one another. The disclosed shape of the channel is highly efficient in connection with heavy or light pressure due to varying loads, for instance.

Preferably, I provide a plurality of instrumentalities for securing the tire-component to the rib-member.

For instance, as shown in Fig. 1 and on a larger scale in Fig. 3, there are a series of transverse plates 11 spaced desirable distances apart and preferably provided at their ends with upstanding and inturned flanges 11ª adapted to engage in an annular groove 12 in each side of the tire. The plates are screwed or otherwise secured to the rim-member. These plates, by reason of the fact that they extend transversely of the rim 3, serve the additional functions of strengthening it and tend to prevent liability of its splitting. Moreover, as they are not formed as a continuous band around the rim, the rim and plates are permitted to expand or contract without producing a separation of the plates from the wooden rim.

Another of the securing instrumentalities is a series of staple-elements 13 which, as shown in Fig. 5, are driven through the sides of the tire—between the points at which the plates 11 grip the tire—and extend into the rim-member.

Still another of the securing-instrumentalities is a series of clamping plates 14 which are of sufficient dimensions to extend into the channel 10 of two proximate sections of the tire and, thus, to span the slight gap between said sections. These plates are slotted to receive bolts 15 which extend through the rim-member, as shown in Fig. 2. The bolts are pushed through holes 16 (formed in the outer or tread portion of the tire) and into holes formed in the rim-member. When these bolts are tightened they will cause the plates 14 to clamp the tire firmly against the periphery of the rim 3. This clamping device also serves to connect and hold the tire-sections together, as will be obvious.

The combined action of these several devices is to secure the sectional tire firmly upon its supporting rim 3.

The parts of these devices are of simple construction, so that it is an easy matter to manipulate them.

The invention is especially adapted to automobile-wheels and is to be used as a substitute for the so-called pneumatic tires now in use and which, by reason of inherent defects in them, sometimes become useless. My tire-structure is such that it can be used on a specially constructed wheel, or it may be equally well applied to existing forms of wheels of standard construction.

Except in so far as the structure is clamped to wheel-felly or rim, it is not secured thereto; hence, it is quickly mountable on and demountable from the same. It may, therefore, be carried or used as an emergency-tire; or marketed as a structure attachable to standard makes of automobile wheels. It has the advantage of being a complete structure in itself and may be sold as an article of manufacture and be kept in stock for standard makes of wheels.

It is to be understood that the invention is susceptible of considerable modification and variation without a departure from the spirit of the invention; and while I have herein described the structure in detail, it is not to be understood that the invention is limited to such details except in so far as they are specified in the claims and which are to be interpreted in any limiting sense except in so far as limitations are imposed thereon by the language employed.

What I claim is:

An emergency tire-structure comprising a plurality of rim sections having curved inner portions adapted to embrace a wheel-rim, said sections being provided with bolt holes and with a transverse groove in spaced relation to the end of each section; loop members, each comprising a body-portion disposed in one of the grooves, and eyes extending beyond the planes of the sides of the rim sections; fastening elements passing through said eyes and adapted to draw the sections together whereby they may be secured to the wheel-rim; a plurality of channeled tire sections secured to the outer periphery of the rim sections, each of said tire sections being provided with a bore extending from the road-engaging surface of the tire section through the channel and into communication with one of the bolt holes 13 in the rim sections; and fastening means comprising a plate disposed in the channel, and bolts disposed in the bolt holes in the rim sections and having a portion disposed in the channel in the tire-section and engaging the plate therein.

I testimony whereof I affix my signature in presence of two witnesses.

WILLIAM E. BUDD.

Witnesses:
EDMUND H. PARRY,
A. M. PARKINS.

Copies of this patent may be obtained for five cents each, by addressing the "Commissioner of Patents, Washington, D. C."